US009611980B2

(12) United States Patent
Herman et al.

(10) Patent No.: US 9,611,980 B2
(45) Date of Patent: Apr. 4, 2017

(54) CHECK VALVE

(71) Applicant: Curtis Roys, Fredericksburg, TX (US)

(72) Inventors: Rodney Herman, Austin, TX (US); Raymond J. Hengel, Round Rock, TX (US); Curtis Roys, Fredericksburg, TX (US)

(73) Assignee: Curtis Roys, Fredericksburg, TX (US)

( * ) Notice: Subject to any disclaimer, the term of this patent is extended or adjusted under 35 U.S.C. 154(b) by 0 days.

(21) Appl. No.: 14/590,736

(22) Filed: Jan. 6, 2015

(65) Prior Publication Data

US 2016/0097486 A1 Apr. 7, 2016

Related U.S. Application Data

(63) Continuation-in-part of application No. 14/504,230, filed on Oct. 1, 2014.

(51) Int. Cl.
| | | |
|---|---|---|
| *F16K 15/00* | (2006.01) | |
| *F16N 23/00* | (2006.01) | |
| *F16K 15/04* | (2006.01) | |
| *F04D 29/063* | (2006.01) | |
| *F04B 53/10* | (2006.01) | |
| *F16N 21/00* | (2006.01) | |

(52) U.S. Cl.
CPC .............. *F16N 23/00* (2013.01); *F04B 53/10* (2013.01); *F04B 53/1002* (2013.01); *F04D 29/063* (2013.01); *F16K 15/042* (2013.01); *F16K 15/044* (2013.01); *F16N 21/00* (2013.01); *Y10T 137/7838* (2015.04); *Y10T 137/88054* (2015.04)

(58) Field of Classification Search
CPC .... F16N 21/00; F16N 21/02; Y10T 137/7838; Y10T 137/7854; Y10T 137/87499; Y10T 137/88054; Y10T 137/88062
USPC .......................................... 184/105.2, 105.3
See application file for complete search history.

(56) References Cited

U.S. PATENT DOCUMENTS

| | | |
|---|---|---|
| 302,343 A | 7/1884 | Kitton |
| 339,251 A | 4/1886 | Ames |
| 942,995 A | 12/1909 | Bargar |
| 1,002,463 A | 9/1911 | Spellmeyer |
| 1,112,631 A | 10/1914 | Longtin |
| 1,201,414 A | 10/1916 | Winkley |
| 1,234,878 A | 7/1917 | Corvin |
| 1,343,677 A | 6/1920 | Langmack |
| 1,512,597 A | 10/1924 | Harmon |

(Continued)

FOREIGN PATENT DOCUMENTS

GB          2117662          10/1983

OTHER PUBLICATIONS

Aerial Corporation, "Double Throttle Check Valve Sandwich Plate," Webpage, [http://www.arielcorp.com/ext_data/vendor_literature/rotary/HYTOS_Check_Valve1989.pdt], Accessed Nov. 19, 2015, 2 pages.

(Continued)

*Primary Examiner* — R. K. Arundale
(74) *Attorney, Agent, or Firm* — Scheinberg & Associates, P.C.; Michael O. Scheinberg

(57) ABSTRACT

A check valve supplies fluid to a system and includes a fluid barrier protects the sealing elements and surfaces of the check valve preventing degradation from any backflow of gas and debris from the system to which fluid is supplied.

21 Claims, 10 Drawing Sheets

(56) References Cited

U.S. PATENT DOCUMENTS

| | | |
|---|---|---|
| 1,524,257 A | 1/1925 | Kensig |
| 1,534,173 A | 4/1925 | Fogelberg |
| 1,632,775 A | 6/1927 | Bijur |
| 1,633,056 A | 6/1927 | Wishart et al. |
| 1,640,600 A | 8/1927 | Crosby |
| 1,664,733 A | 4/1928 | Braun |
| 1,734,292 A | 11/1929 | Gonzalez |
| 1,770,683 A | 7/1930 | Kenneth |
| 1,940,452 A | 12/1933 | Glab |
| 1,946,339 A | 2/1934 | Wigers et al. |
| 1,949,639 A | 3/1934 | Zimmerer |
| 2,048,323 A | 7/1936 | Cutts |
| 2,202,211 A | 5/1940 | Klingr |
| 2,241,718 A | 5/1941 | Meixsell |
| 2,306,012 A | 12/1942 | Campbell |
| 2,531,319 A | 11/1950 | Briggs |
| 2,554,481 A | 5/1951 | Sheen et al. |
| 2,724,555 A | 11/1955 | Proetter |
| 2,809,659 A | 10/1957 | Gillespie et al. |
| 2,845,945 A | 8/1958 | Mancusi |
| 3,202,178 A | 8/1965 | Wolfe |
| 3,292,498 A | 12/1966 | Zimmerman |
| 3,371,745 A | 3/1968 | Callahan et al. |
| 3,409,104 A | 11/1968 | Acker et al. |
| 3,491,788 A | 1/1970 | Kilayko |
| 3,491,795 A | 1/1970 | Jennings et al. |
| 3,656,584 A | 4/1972 | Lyden |
| 3,769,999 A | 11/1973 | Flanagan et al. |
| 3,834,124 A | 9/1974 | Ichikawa |
| 3,923,435 A | 12/1975 | Jones |
| 4,671,915 A | 6/1987 | Keiji et al. |
| 4,862,911 A | 9/1989 | Yie |
| 5,025,762 A | 6/1991 | Gohara et al. |
| D321,928 S | 11/1991 | Milo |
| D339,399 S | 9/1993 | Lin |
| D364,210 S | 11/1995 | Loerop et al. |
| 5,490,874 A | 2/1996 | Kuster et al. |
| D370,963 S | 6/1996 | Daansen |
| 5,662,023 A | 9/1997 | Carson et al. |
| 5,698,117 A | 12/1997 | Doutt |
| 5,835,372 A | 11/1998 | Roys et al. |
| 6,021,805 A | 2/2000 | Horne et al. |
| D426,617 S | 6/2000 | Hansen |
| 6,247,487 B1 | 6/2001 | Skill |
| 6,467,854 B2 | 10/2002 | Frank et al. |
| 6,779,558 B1 | 8/2004 | Bruck et al. |
| D496,091 S | 9/2004 | Katzman et al. |
| 6,893,485 B2 | 5/2005 | MacDuff |
| D576,704 S | 9/2008 | Gilcher |
| 7,434,593 B2 | 10/2008 | Noll et al. |
| 7,458,388 B2 | 12/2008 | Huang |
| 7,806,142 B2 | 10/2010 | Baros et al. |
| 7,905,557 B2 | 3/2011 | Frank et al. |
| 8,555,927 B2 | 10/2013 | Roys |
| 8,622,082 B1 | 1/2014 | Roys |
| 8,770,543 B2 | 7/2014 | Huynh |
| 8,807,170 B2 | 8/2014 | Klaphake et al. |
| 8,899,279 B2 | 12/2014 | Safronovs |
| 8,939,176 B2 | 1/2015 | Klaphake et al. |
| 2003/0111115 A1 | 6/2003 | Schultz et al. |
| 2005/0115614 A1 | 6/2005 | Einhaus |
| 2010/0163775 A1* | 7/2010 | Kim .................. F16K 1/12 251/357 |
| 2014/0000983 A1 | 1/2014 | Roys |

OTHER PUBLICATIONS

Sloan Brothers Company, "Omni Air Trap: Part #SB-OT-1/4 SB-OT-1/8," WebSite, [www.sbco.com], Accessed Nov. 19, 2015, 1 page.

Hopkins, Ellen, "New Divider Block Lube-System Check Valve and Check Valve Protector," CompressorTech, Mar. 2006, 3 pages.

CPI Lubrication Group, "XDC—Extreme Duty Check Valve and CVP Check Valve Protector", www.enproindustries.com, Accessed Jan. 2014.

* cited by examiner

CHECK VALVE

This application is a continuation-in-part of U.S. patent Ser. No. 14/504,230, filed Oct. 1, 2014, which is hereby incorporated by reference.

TECHNICAL FIELD OF THE INVENTION

The present invention relates to extending the life of check valves in hostile environments, and is particularly suitable for use in lubrication systems for natural gas compressors.

BACKGROUND OF THE INVENTION

Natural gas compressors require a consistent supply of lubricant. To enter the compressor, the lubricant must be delivered at a pressure that is greater than the pressure within the compressor. Lubricant is typically distributed to the lubrication points by a divider block, which periodically delivers a small amount of lubricant at a high pressure to each lubrication point. A check valve is used to prevent hot gases from the compressor cylinder from flowing into the lubrication system when the pressure from the lubrication system is reduced, such as between cycles of the divider block. When the lubricant pressure is sufficiently high, the check valve opens and lubricant is injected into the compressor cylinder. When the lubricant pressure is reduced, the spring closes the valve to prevent gases from the compressor cylinder from entering the lubrication system.

Prior art check valves fail due to hot gas and debris entering the check valve each time the pump causes it to open to allow lubricant to be injected into the compressor cylinder or rod packing gland. The opening of the check valve exposes the seating surfaces to the hot gas and debris that are in the gas stream of the compressor. The hot gas heats the sealing surfaces in the check valve causing it to fail prematurely. The debris in the gas stream migrates into the check valve and causes the balls to stick open. As the debris lodges between the sealing surface and the ball, the hot gas migrates upstream into the lubricant tubing and causes problems with the pistons that inject oil into the cylinder or rod packing gland.

One known solution is a separate device, a check valve protector, installed on the downstream side of the check valve to protect the sealing surfaces. This solution adds extra cost to the components and adds another lubricant leak path to the system. Another disadvantage of current check valve protectors is the positioning of the lubricant inlet. The inlet is typically oriented at a 90-degree position from the check valve protector axis, which prevents the check valve protector from being installed in many applications where the cylinder is close to another cylinder. Another problem with prior art check valve protectors is that they incorporate a single NPT thread on the outlet. This can cause installation difficulties when installing the device. Due to the 90-degree inlet of this device, in many cases it must be over-torqued to position it correctly to align with the system tubing connection. This over-torquing causes extreme stress on the threads in the compressor cylinder, and has been known to destroy both the cylinder threads and the threads on the device. The over-torquing of the threads deforms the metal and not only causes issues with leaking explosive gases to the atmosphere, but also eliminates the ability to reuse that particular injection point if a new device has to be installed. When this occurs, the compressor cylinder must be removed and sent to a machine shop to be repaired or a new cylinder must be installed, which costs the owner/operator thousands of dollars.

SUMMARY OF THE INVENTION

An object of the invention is to provide a more reliable check valve in which the integrity of the sealing surfaces within the check valve, and other components of the lubrication system, are protected from hot gas and debris that may leak or migrate into the check valve.

Some embodiments of a valve include a housing having an axial conduit extending along a central axis from an inlet at one end for entry of fluid into the housing to an outlet at an opposite end for exit of fluid from the housing; a check valve body disposed within the axial conduit of the valve housing; and a fluid flow path through which fluid flows from the inlet through the check valve body to the outlet, wherein fluid is retained within a portion of the fluid flow path to substantially surround the check valve body preventing gas and debris from the outlet from entering the check valve body.

Some embodiments include a housing having an inlet at one end for entry of fluid into the housing and an outlet at an opposite end for exit of fluid from the housing; a check valve disposed within the housing; and a fluid flow path in which fluid flows from the inlet through the housing to the outlet, the fluid flow path including a barrier portion wherein fluid is retained to substantially prevent gas and debris from fouling the check valve, the barrier portion providing a sufficiently small gap so that the fluid remains in the gap due to surface tension.

The foregoing has outlined rather broadly the features and technical advantages of the present invention so the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
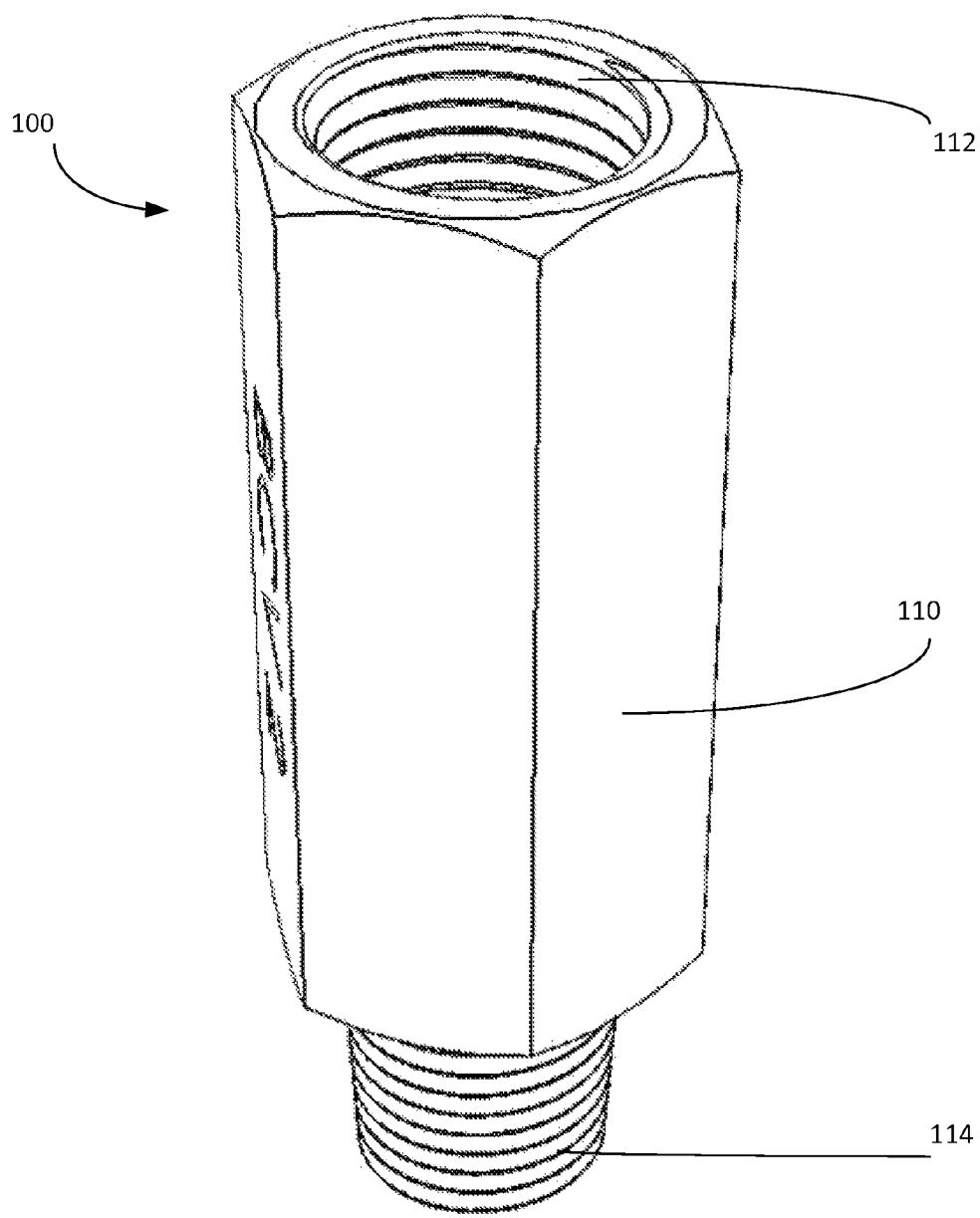
FIG. 1 is a perspective view of a check valve that is shown in accordance with an illustrative embodiment.

Some embodiments provide a check valve that is capable of connection with mechanical and/or fluid systems in which distally opposed connections are in axial alignment to allow incremental tightening to prevent over-torquing which might damage the connection and possibly cause mechanical failure at the connection.

In some embodiments, a check valve includes a valve housing having a first connection at one end and a second connection at an opposite, distal end. The first and second connections are aligned along a central axis of the valve housing. A valve body is located within the valve housing and is aligned along its central axis. The valve housing and valve body together define a fluid flow path through which fluid flows from the inlet to the outlet. The flow path extends from the inlet through and out of the interior of the valve body. It continues between the valve body and valve housing to the outlet. The flow path includes a portion forming a fluid jacket between the valve housing and valve body so that the valve body is surrounded by the fluid jacket. The fluid jacket retains fluid between the interior of the valve body and the outlet which, when used with a natural gas compressor lubrication system, prevents hot gases and debris produced by the compressor from entering the flow path and degrading sealing surfaces within the check valve.

In some embodiments, a check valve includes a valve housing having a first connection at one end and a second connection at an opposite, distal end. The first and second connections are aligned along a central axis of the valve housing. A valve body is located within the valve housing and is aligned along its central axis. The valve housing and valve body together define a fluid flow path through which fluid flows from the inlet to the outlet. The flow path extends from the inlet through the interior of the valve body, out of the valve body continuing between the valve body and valve housing, and back through the interior of the valve body to the outlet. The flow path includes a portion forming a fluid jacket between the valve housing and valve body so that the valve body is surrounded by the fluid jacket. The fluid jacket retains fluid between the interior of the valve body and the outlet which, when used with a natural gas compressor lubrication system, prevents hot gases and debris produced by the compressor from entering the flow path and degrading sealing surfaces within the check valve.

Some embodiments of a check valve include a valve housing having a first connection at one end and a second connection at an opposite, distal end. The first and second connections are aligned along a central axis of the valve housing. A valve body is located within the valve housing and is aligned along its central axis. The valve housing and valve body together define a fluid flow path through which fluid flows from the inlet to the outlet. The flow path includes a portion forming a fluid jacket between the valve housing and valve body so that the valve body is surrounded by the fluid jacket. The fluid jacket retains fluid between the interior of the valve body and the outlet which, when used with a natural gas compressor lubrication system, prevents hot gases and debris produced by the compressor from entering the flow path and degrading sealing surfaces within the check valve. In a natural gas compressor lubrication system, a preferred check valve includes a flow path having a portion that defines a fluid jacket between the sealing components of the check valve and the outlet to the compressor. The fluid jacket prevents compressor backflow of hot gases and debris from entering the flow path. In the description below, the terms "top" and "bottom" are used in relation to the figures.

Referring now to FIGS. 1-7, a first embodiment of a check valve is shown according to an illustrative embodiment. Check valve 100 comprises valve housing 110. Valve housing 110 can be constructed from a solid piece of metal, such as stainless steel. The material chosen will depend on the application, but for use in a natural gas compressor lubrication system, the material should be resistant to corrosion by the gases and debris in the compressor.

A cavity 112, having female pipe threads, is formed at a first end of valve housing 110. Cavity 112 serves as a fluid inlet into the valve housing 110 and can be used to attach check valve 100 a fluid reservoir, such as a source of lubricating oil, by female pipe threads. Distal from the cavity 112, valve stem 114, having male pipe threads, is formed at a second end of valve housing 110 and serves as a fluid outlet supplying fluid to an attached system. By using male pipe threads, valve stem 114 can be adapted to attach check valve 100 to machinery or equipment to which fluid is to be provided. The threaded connections at the inlet and outlet are coaxial along central axis 211.

Figure 2:
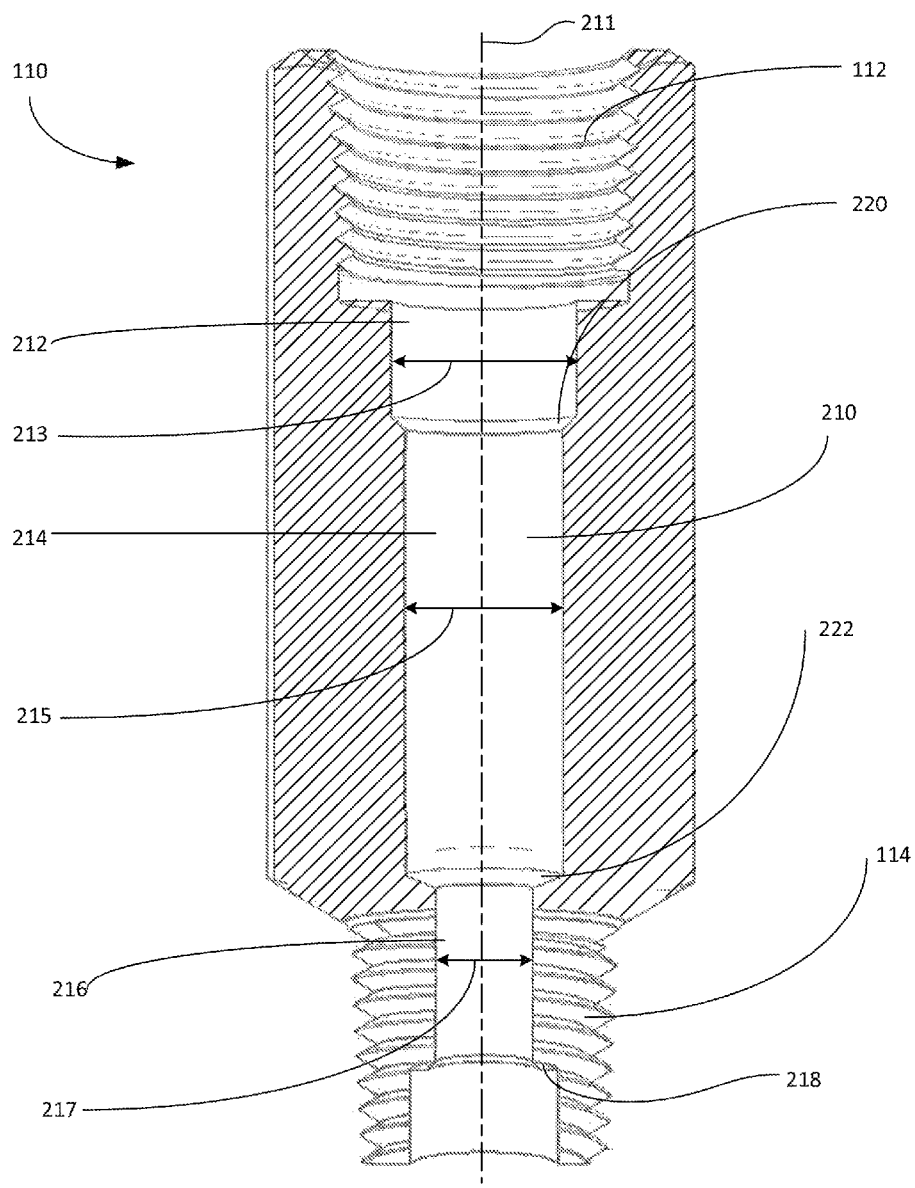
FIG. 2 is a cross-sectional view of a valve housing that is shown in accordance with an illustrative embodiment.

Referring now to FIG. 2, a cross-sectional view of valve housing 110 is shown in accordance with an illustrative embodiment. Valve housing 110 includes axial conduit 210 extending longitudinally through the center thereof along central axis 211, connecting cavity 112 to valve stem 114.

In FIG. 2, axial conduit 210 is comprised of a plurality of sections, each section having a different diameter. Section 212 has a diameter 213. Section 214 has a diameter 215. Section 216 has a diameter 217. Shoulder 218 is formed within the conduit 210 to engage second valve body section 600, described in FIG. 6 below.

Seat 220 transitions section 212 to section 214. Seat 220 is a ridge within axial conduit 210 that forms a step down from diameter 213 to diameter 215. Seat 222 transitions section 214 to section 216. Seat 222 is a ridge within axial conduit 210 that forms a step down from diameter 215 to diameter 217.

Figure 3:
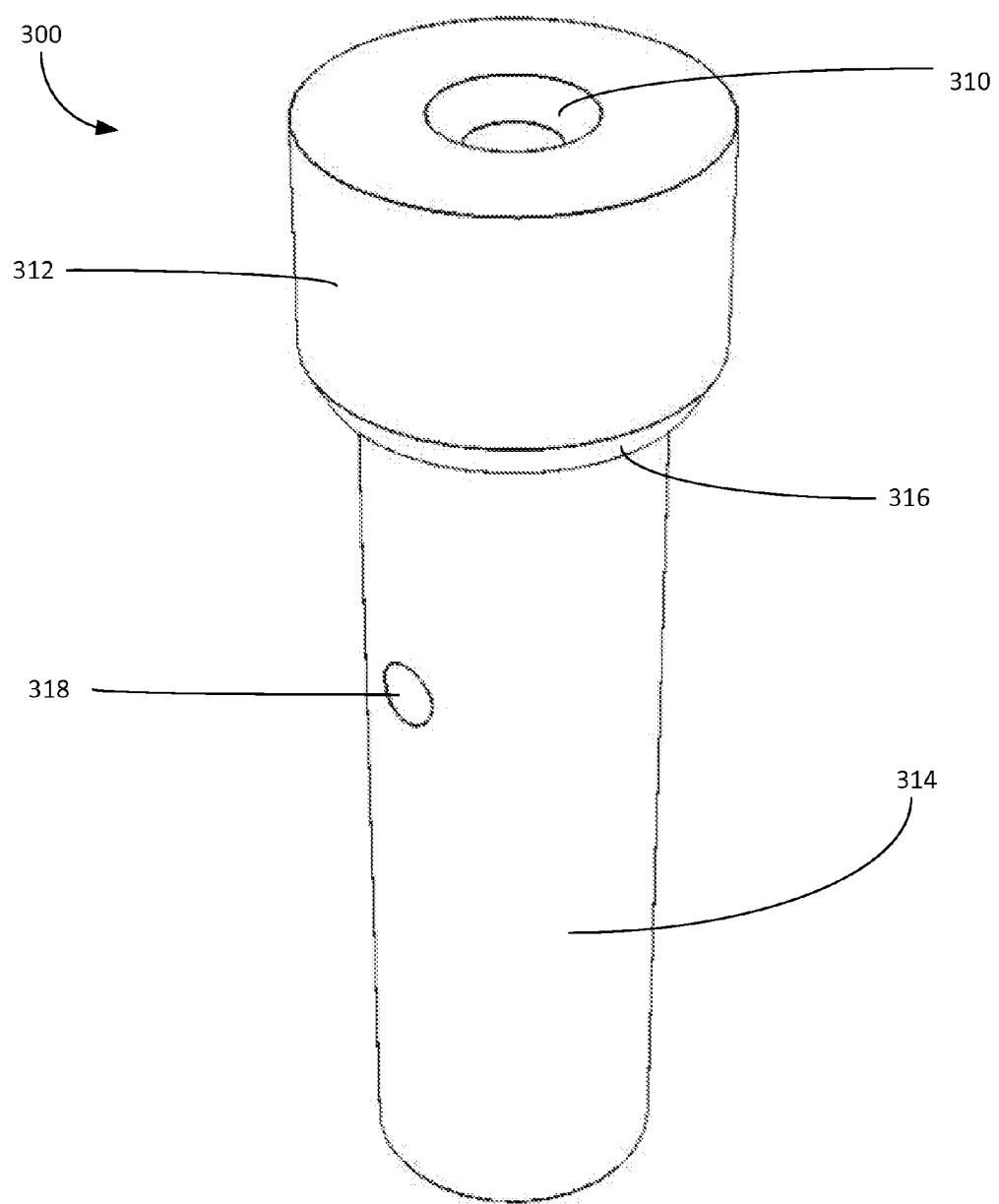
FIG. 3 is a perspective view of a first valve body section that is shown in accordance with an illustrative embodiment.

A valve body is located within valve housing 110 and includes first and second sections. Referring now to FIG. 3, a perspective view of a first valve body section is shown in accordance with an illustrative embodiment. First valve body section 300 is adapted to be positioned within axial conduit 210.

Figure 4:
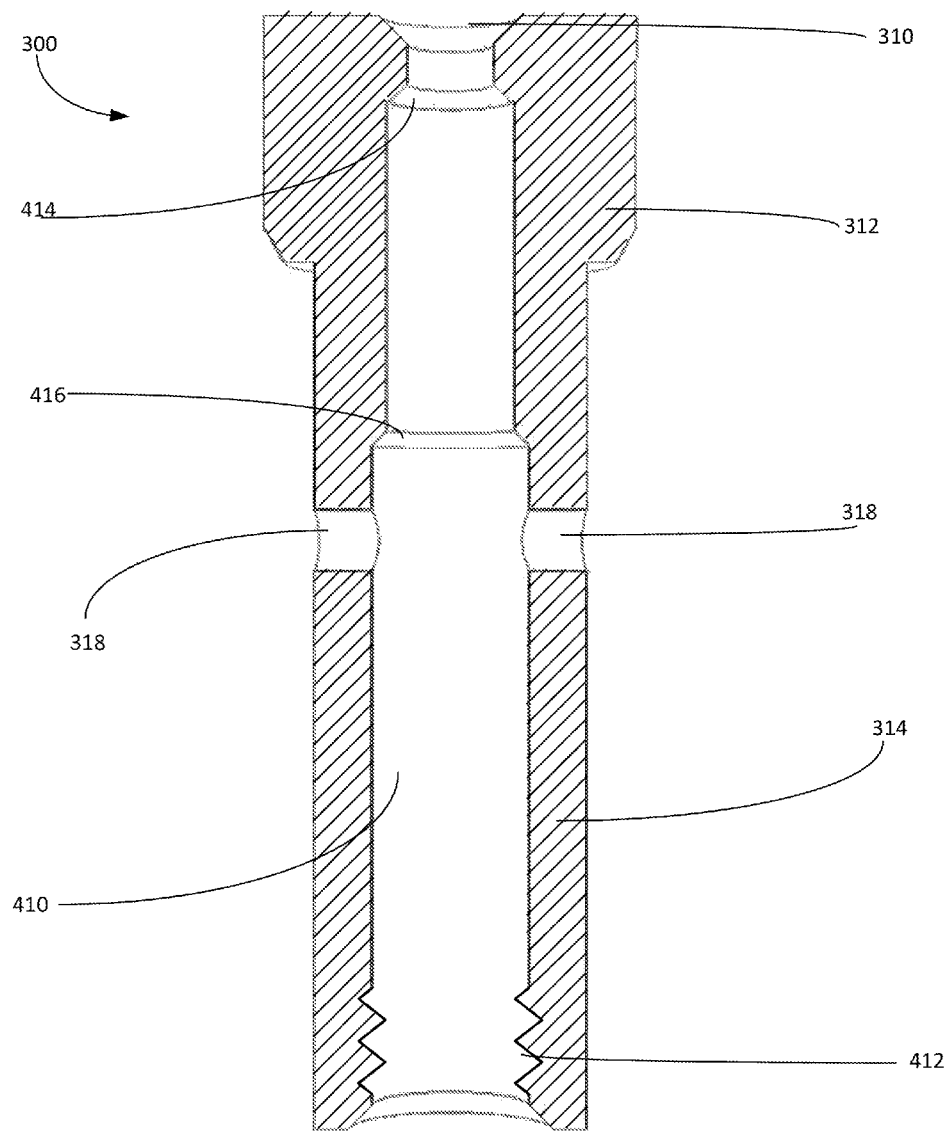
FIG. 4 is a cross-sectional view of a first valve body section shown according to an illustrative embodiment.

First valve body section 300 includes an inlet port 310 allowing for fluid ingress through head 312 into inner conduit 410, shown in FIG. 4. Head 312 connects with annular inner body 314 at taper 316. Annular inner body 314 is adapted to be received within axial conduit 210 of valve housing 110.

First valve body section 300 includes a set of radial conduits 318. As used herein, a set can include one or more radial conduits. Radial conduits 318 allow fluid passage from inner conduit 410, shown in FIG. 4, to the exterior of annular inner body 314.

Referring now to FIG. 4, a cross-sectional view of first valve body section 300 is shown according to an illustrative embodiment. Inlet port 310 allows fluid to flow into inner conduit 410. Inner conduit 410 extends longitudinally through first valve body section 300. According to an illustrative embodiment, inner conduit 410 includes threaded female section 412 distal from inlet port 310. Female threaded section 412 allows first valve body section 300 to connect to second valve body section 600, shown in FIG. 6, forming the valve body.

According to an illustrative embodiment, inner conduit 410 is comprised of a plurality of sections, each section having a different diameter corresponding to a ball utilized for that section of the valve. The corresponding balls used in each section of the first valve body section 300 are shown in FIG. 5.

Figure 5:
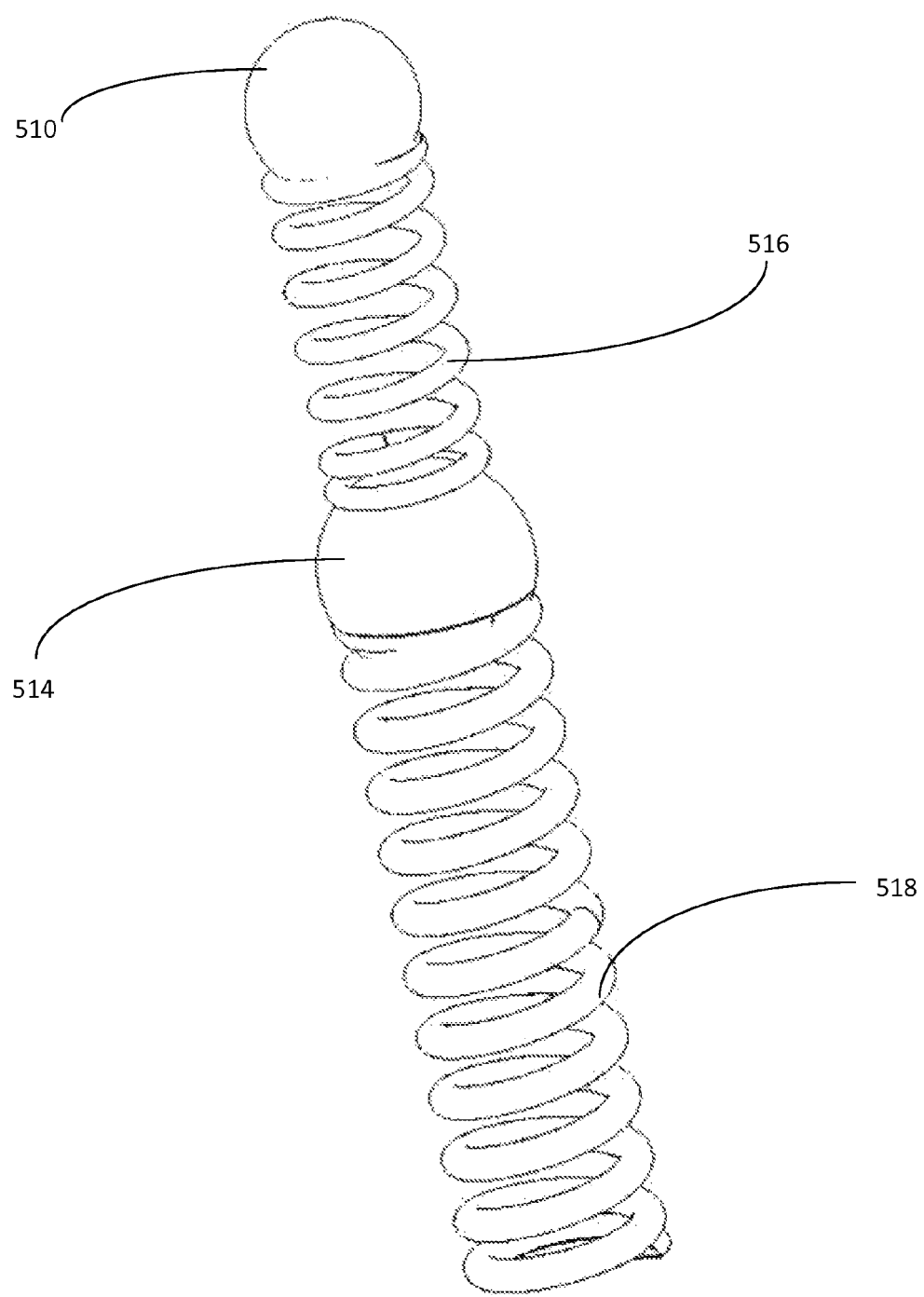
FIG. 5 is a set of sealing ball and bias springs for use in a check valve shown according to an illustrative embodiment.

Seat 414 is an interior surface of inner conduit 410 which contacts the ball 510, shown in FIG. 5, to form a leak-tight seal. Seat 416 is an interior surface of inner conduit 410 which contacts the ball 514, shown in FIG. 5, to form a leak-tight seal.

Radial conduits 318 allow fluid passage from inner conduit 410, shown in FIG. 4, to the exterior of annular inner body 314. Radial conduits 318 extend transversely across inner conduit 410. According to an illustrative embodiment, radial conduits 318 are formed beneath seat 416.

Referring now to FIG. 5, a set of sealing balls and biasing springs are shown according to an illustrative embodiment. Ball 510 is adapted to be positioned within inner conduit 410. When check valve 100 is closed, ball 510 is positioned against seat 414 to form a seal, preventing fluid exchange between inlet port 310 and inner conduit 410. Spring 516 provides a bias to ball 510. Spring 516 is adapted to be positioned within inner conduit 410, biasing ball 510 against seat 414.

Ball 514 is adapted to be positioned within inner conduit 410. When check valve 100 is closed, ball 514 is positioned against seat 416 to form a seal, preventing fluid exchange between inner conduit 410 and axial conduits 318. Spring 518 provides a bias to ball 514. Spring 518 is adapted to be positioned within inner conduit 410, biasing ball 514 against seat 416.

Figure 6:
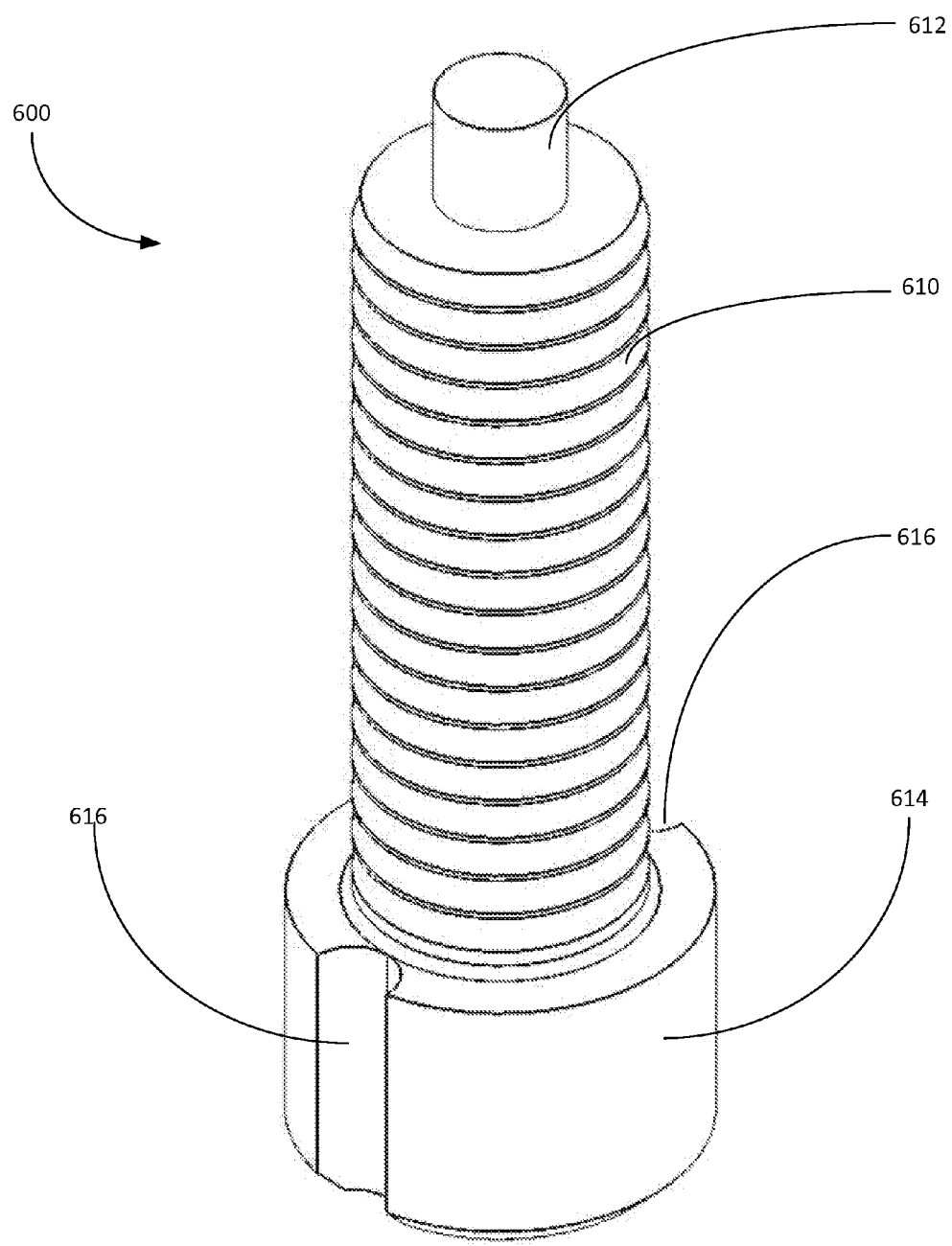
FIG. 6 is a second valve body section for use in a check valve shown according to an illustrative embodiment.

Referring now to FIG. 6, a second valve body section 600 is shown according to an illustrative embodiment. When assembled, second valve body section 600 is adapted to slide through section 216 of the valve housing 110 and engage female threaded section 412 of first valve body section 300. Second valve body section 600 includes male threaded portion 610. Male threaded portion 610 preferably slidably engages valve housing 110 through section 216 and can then engage female threaded section 412 of first valve body section 300.

In an illustrative embodiment, second valve body section 600 includes spring support 612. Spring support 612 is a cylindrical protrusion extending axially from second valve body section 600. Spring support 612 is adapted to engage spring 518 within inner conduit 410 of the assembled check valve 100. Second valve body section 600 includes head 614 adapted to engage and substantially abut shoulder 218 of valve housing 110 to form a fluid seal with an interference fit.

Second valve body section 600 includes a set of fluid output grooves 616. Fluid output grooves 616 allow fluid to escape from check valve 100 past the seal between head 614 and shoulder 218 of valve housing 110. In one illustrative embodiment, fluid output grooves 616 are arcuate incursions into head 614 that are substantially parallel with the central axis of second valve body section 600, which coincides with central axis 211 of valve housing 110.

Figure 7:
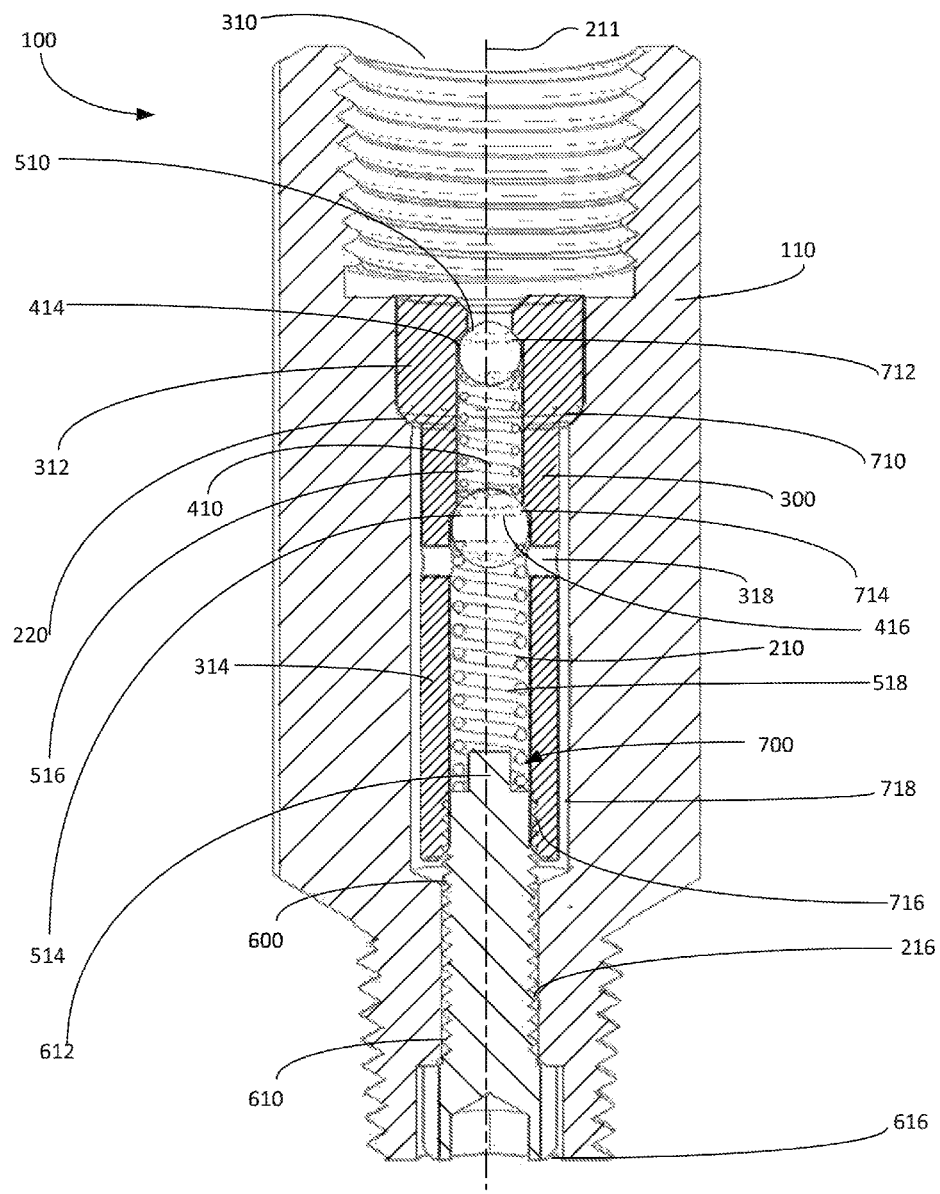
FIG. 7 is a cross-sectional view of a check valve according to an illustrative embodiment shown in a closed position.

Referring now to FIG. 7, a cross-sectional view of check valve 100 is shown in a closed position according to an illustrative embodiment. Check valve 100 includes the assembled pieces of valve housing 110 and valve body 700 that includes first valve body section 300 and second valve body section 600, as well as sealing balls 510, 514 and biasing springs 516, 518.

Head 312 of first valve body section 300 is adapted to sit within section 212 of the valve housing 110. Head 312 engages seat 220 of first valve body section 300 at interface 710 creating an interference leak-tight seal. Annular inner body 314 extends concentrically along section 214 of valve housing 110. Annular inner body 314 has a diameter that is less than diameter 215, such that annular oil jacket 718 is formed between the outer surface of annular inner body 314 and the inner surface of axial conduit 210 along section 214 of valve housing 110.

Ball 510 is adapted to be positioned within inner conduit 410. When check valve 100 is closed, ball 510 is positioned against seat 414 at interface 712 to form a seal, preventing fluid exchange between inlet port 310 and inner conduit 410. Spring 516 provides a bias to ball 510. Spring 516 is adapted to be positioned within inner conduit 410, biasing ball 510 against seat 414.

Ball 514 is adapted to be positioned within inner conduit 410. When check valve 100 is closed, ball 514 is positioned against seat 416 to form a seal, preventing fluid exchange between inner conduit 410 and axial conduits 318. Spring 518 provides a bias to ball 514. Spring 518 is adapted to be positioned within inner conduit 410, biasing ball 514 against seat 416. Spring 518 is positioned within inner conduit 410 through engagement with spring supports 612. Male threaded portion 610 of second valve body section 600 mates with female threaded section 412 of first valve body section 300 to form a leak-tight seal at interface 716.

When a fluid source applies sufficient pressure to the check valve 100 at inlet port 310, spring 516 and spring 518 are compressed. Both ball 510 and ball 514 are moved distally away from the inlet port 310, allowing the fluid to flow through inlet port 310 and into inner conduit 410. Inner conduit 410 is blocked at interface 716 by second valve body section 600. Fluid therefore moves from inner conduit 410 through radial conduits 318 and into annular oil jacket 718 between the outer surface of annular inner body 314 and the inner surface of axial conduit 210.

The lower portion axial conduit 210 is not threaded, so threads of second valve body 600 do not engage with housing 110. Fluid from annular oil jacket 718 is therefore allowed to flow annularly around second valve body section 600 through section 216 of axial conduit 210. Fluid can then flow through fluid output grooves 616, and into machinery or equipment to which fluid is to be provided. The release of fluid into any machinery or equipment decreases pressure within check valve 100. Spring 516 and Spring 518 can restore ball 510 and 514 to their seated positions against seat 414 and seat 416, respectively. When the check valve 100 has closed, pressure in the machinery or equipment to which fluid is supplied prevents fluid within annular oil jacket 718 from draining out and retains fluid within the annular oil jacket 718. The sealing elements of check valve 100, including seats 414, 416 and balls 510 and 514, are surrounded by the annular oil jacket 718. Fluid that is retained within annular oil jacket 718 protects the sealing elements from any hot gases and debris from the machinery or equipment to which fluid is supplied.

Figure 8:
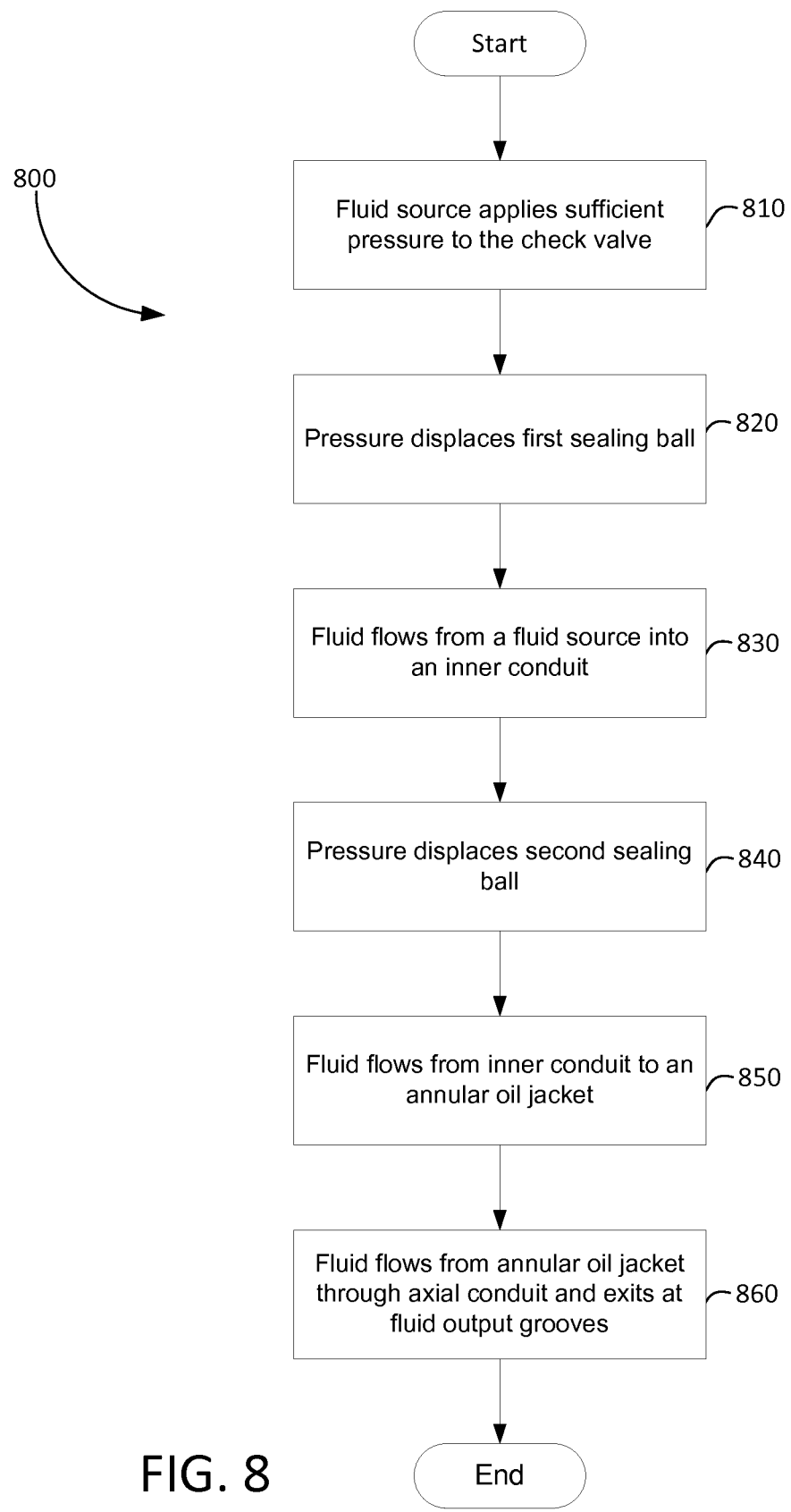
FIG. 8 is a flowchart of a process for supplying fluid to a machinery or equipment from a fluid reservoir using a check valve according to an illustrative embodiment.

Referring now to FIG. 8, a flowchart shows the process steps of supplying a fluid to machinery or equipment from a fluid reservoir utilizing a check valve, including a valve body located within a valve housing, according to an illustrative embodiment. Process 800 is a mechanical process illustrating movement of a fluid through a check valve, such as check valve 100 of FIG. 1.

Process 800 begins when a fluid source applies sufficient pressure to the check valve (step 810). Pressure applied from this fluid source causes a first valve to open by displacing a first sealing ball (step 820). The sealing ball can be, for example, ball 510 of FIG. 5. When the sealing ball is displaced, fluid flows from the fluid source into an inner conduit (step 830). The inner conduit can be, for example, inner conduit 410 of FIG. 4.

Pressure within the inner conduit displaces a second sealing ball (step 840). The second sealing ball can be, for example, ball 514 of FIG. 5. Fluid then flows from the inner conduit to an annular oil jacket (step 850). The annular oil jacket can be, for example, annular oil jacket 718 of FIG. 7. The fluid flows from the inner conduit to the annular oil jacket via a set of radial conduits, such as radial conduits 318 of FIG. 4.

Fluid flows from the annular oil jacket through an axial conduit and exits the check valve through a set of fluid output grooves (step 860). According to an illustrative embodiment, the fluid can exit the check valve by flowing annularly around a portion of the valve body, such as second valve body section 600 through section 216 of axial conduit 210, and through fluid output grooves, such as fluid output grooves 616 of FIG. 6.

Figure 9:
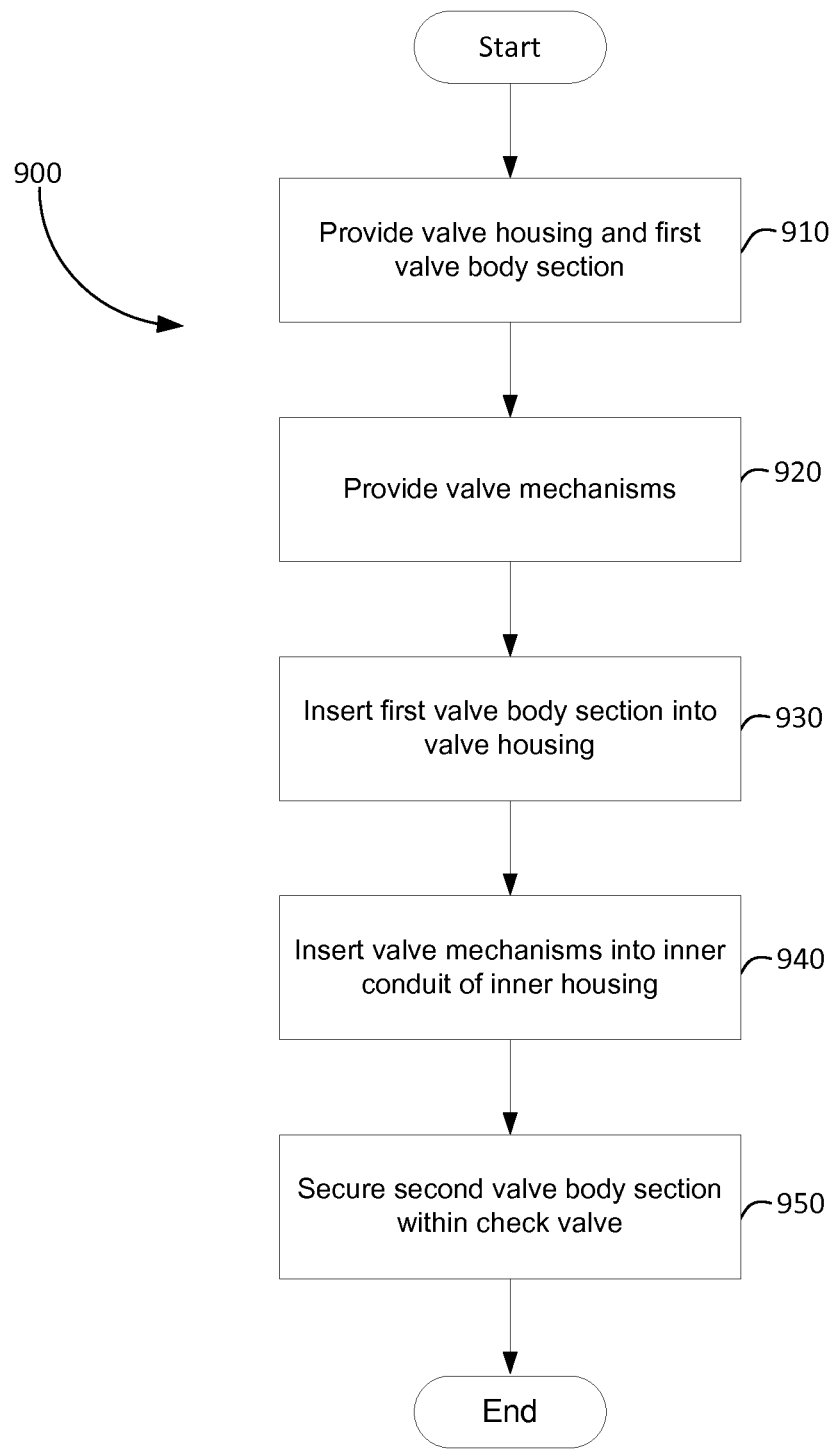
FIG. 9 is a flowchart of a process for manufacturing a check valve shown according to an illustrative embodiment.

Referring now to FIG. 9, a flowchart of a process for manufacturing a check valve is shown according to an illustrative embodiment. Process 900 can be utilized to manufacture a check valve such as check valve 100 of FIG. 1.

Process 900 begins by providing a valve housing and a first valve body section (step 910). The valve housing can be, for example, valve housing 110 of FIG. 1 and the first valve body section can be, for example, first valve body section 300 of FIG. 3. One or more valve mechanisms, for example, a set of balls and springs, are also provided (step 920). The first valve body section is then inserted into the valve housing (step 930). In an illustrative embodiment, the first valve body section can be secured within the valve housing using mechanical process, such as for example, press fitting the first valve body section within the valve housing.

The valve mechanism is then inserted into the inner conduit of the first valve body section (step 940). A second valve body section 600 is then secured within the check valve (step 950). The second valve body section can further secure the first valve body section within the valve housing, and also provide an annular flow path for fluid to exit the check valve.

Figure 10:
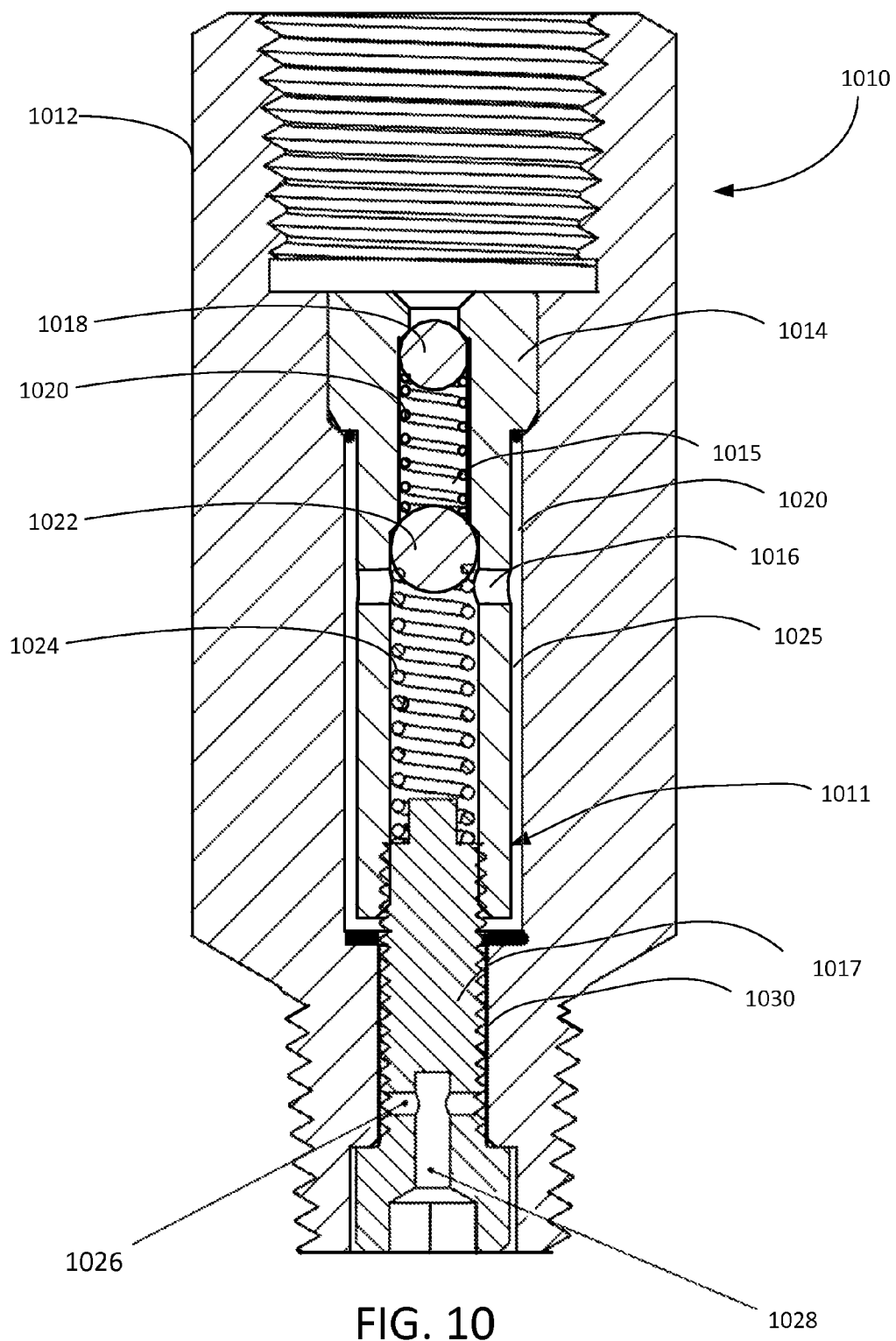
FIG. 10 is a cross-sectional view of another embodiment of a check valve according to an illustrative embodiment shown in a closed position.

Referring now to FIG. 10, a cross sectional view of a second embodiment of a check valve is shown in a closed position according to this invention. Check valve 1010 includes the assembled pieces of valve housing 1012 and valve body 1011. Valve body 1011 includes first valve body section 1014 and second valve body section 1017. The external threads of second valve body section 1017 engage with the internal threads of first valve body section to secure the first valve body section 1014 within valve housing 1012. First valve body section 1014 includes an inner conduit 1015 and radial outlets 1016, as well as sealing balls and biasing springs 1018, 1020, 1022, 1024, respectively. Check valve 1010 is similar to check valve 100 as shown in FIGS. 1-7 with an annular fluid jacket 1025 formed between valve housing 1012 and valve body 1011. The lower portion 1030 of the housing bore is not threaded, so threads of second valve body 1017 do not engage with housing 1012, and lubricant can flow between the external threads of second valve body section 1017 and the walls of lower portion 1030. Second valve body section 1017 includes radial conduits 1026 and a central outlet port 1028 through which lubricant or other fluid is delivered.

Fluid enters check valve 1010 in the same manner as described regarding check valve 100 in FIG. 7 wherein a fluid source applies sufficient pressure to the check valve 1010 to compress ball 1018, spring 1020, ball 1022, and spring 1024, allowing the fluid to flow through inner conduit 1015 and radial conduits 1016 into annular fluid jacket 1025. Fluid then flows from annular fluid jacket 1025 around the threaded portion of second valve body section 1017. The fluid then flows through radial conduits 1026 and exits the check valve through outlet port 1028. In some embodiments, some lubricant can still flow around the outside of second valve body section 1017 and out through the bottom of housing 1012.

When check valve 1010 is closed, fluid is retained within annular fluid jacket 1025 and/or between second valve body section 1017 and lower portion 1030 of the housing bore to protect the sealing elements and surfaces from any hot gases and debris that may enter from the system to which fluid is supplied.

Some embodiments do not rely on a gravity trap, in which liquid is trapped by gravity in a "U" shaped structure, to maintain a protective fluid between the outlet and the sealing elements. Instead, some embodiments rely on surface tension and/or the adhesive forces between the fluid and the material composing the valve to maintain a barrier layer of fluid in a thin gap between the fluid outlet and the sealing elements. For example, annular fluid jackets 718 (FIG. 7) and 1025 (FIG. 10) may provide annular gaps that maintain a fluid barrier. The gap between the valve housing body and the second valve body section may also maintain a fluid barrier. The gap should be sufficiently small so that the fluid remains in the gap regardless of the orientation of the valve assembly, but sufficiently large that the fluid will flow through the gap under the influence of the pressure at the fluid inlet. The thickness of the region providing the fluid barrier will depend on the physical properties of the liquid, such as viscosity and surface tension, the interaction of the fluid with the valve surfaces, and the pressure of the fluid coming into the valve. A high viscosity fluid can be maintained in a wider gap than can a low viscosity fluid. For example, when the valve is used in a natural gas compressor lubrication system, which typically operates with an inlet lubricant pressure of between a few hundred psi and a few thousand psi, annular fluid jackets 718 and 1025 are typically between 10 and 30 thousandth of an inch, more preferably between 15 and 25 thousandth of an inch. In one embodiment, the gap width is 20 thousandth of an inch. In another embodiment, the gap is as small as 5 thousandth of an inch. A skilled person will be able to determine a suitable gap for any particular fluid and pressure without undue experimentation based on the description above.

Illustrative embodiments described herein provide an oil reservoir that surrounds the internal components which protects the sealing surfaces from hot oil or gas.

These embodiments can ultimately reduce the need to shut down a compressor to change a failed check valve. The cost to shut down a compressor to change a failed check valve can amount to tens of thousands of dollars because when the compressor is shut down, all production of gas is halted.

By reducing compressor down time, embodiments can reduce pollution, because when the compressor is shut down the gas that was being compressed must be flared to the atmosphere, which pollutes the earth's atmosphere.

Reducing the quantity of gas that is flared when a compressor is shut down also reduces fines imposed for flaring.

The in-line design enables embodiments to be installed on any compressor or in any place a check valve is needed to prevent backflow of lubricant into a lubricating system.

While the embodiments described above are adapted for use in a natural gas compressor, the invention is not limited to any specific application. A preferred check valve used in a natural gas compressor lubrication system can be used in systems at pressures of 10,000 psi and at high temperatures, and can withstand the chemical environment. While the Figures show the use of ball valves inside the check valve, other types of valves, such as poppet valves can also be used. Embodiments could use any type of internal valve besides those mentioned above, for example, diaphragm valves, swing check valves, or disk valve.

Embodiments of this invention provide a valve for supplying fluid from a fluid source to a system in which the valve includes a housing having an axial conduit extending along a central axis from an inlet at one end for entry of fluid into the housing to an outlet at an opposite end for exit of fluid from the housing; a check valve body disposed within the axial conduit of the valve housing; and a fluid flow path through which fluid flows from the inlet through the check valve body to the outlet, wherein fluid is retained within a portion of the fluid flow path to substantially surround the check valve body preventing gas and debris from the outlet from entering the check valve body. The inlet and the outlet are aligned along the central axis and the check valve body is coaxial with the housing. The check valve body includes a first valve body section having a first end adjacent to the inlet of the housing and a distal end. A second valve body section includes a first end rotatably connected to the distal end of the first valve body section forming a fluid seal and a second distal end adjacent to the outlet of the housing. The fluid flow path extends from the inlet of the housing into the first valve body section at an inlet port through a central conduit and out through at least one radial port to the axial conduit that forms an annular fluid jacket between the first and second valve body sections and the housing, so that the annular fluid jacket retains fluid preventing gas and debris from entering the central conduit of the first valve body section. In one embodiment, the second valve body section includes at least one groove at the second distal end extending along an outer surface of the second valve body section to the outlet of the housing. In another embodiment, the second valve body section includes at least one port at the second distal end in communication with the annular section and a central axial outlet port in communication with the outlet. The first valve body section has at least one check valve located within the central conduit between the inlet port and the at least one radial port. The check valve is a ball biased by a spring. The first end of the second valve body section is received within the central conduit of the first valve body section and supports the spring. Rotation of the second valve body section within the first valve body section compresses the spring loading the ball against the inlet port. The housing is threaded at the inlet for connection to a fluid source and is threaded at the outlet for connection to a system to which fluid is supplied. The threaded connections are coaxial along the central axis of the housing.

Some embodiments of the invention provide a method of manufacturing a valve structure by forming a housing having an axial conduit extending from a fluid inlet at a first end to a fluid outlet at a second end and forming a check valve body having a first valve body section and a second valve body section. The first valve body section is formed with an inlet port to conduct fluid through the check valve body to an outlet port in the second valve body section. Positioning the check valve body within the axial conduit of the housing forms a fluid flow path that extends from the inlet through the check valve body to the outlet, wherein a portion of the fluid flow path is formed to retain fluid to surround the check valve body to prevent gas and debris from entering the check valve body. The fluid inlet of the housing is threaded to allow connection to a fluid source and the fluid outlet of the housing is threaded to allow connection to a system to which fluid is supplied. The threaded connection at the inlet and the outlet are coaxial along a central axis of the housing. The first valve body section is formed to be rotatably connected to the second valve body section. The check valve body is formed with a spring biased ball valve. The fluid flow path is formed to retain fluid between the spring biased ball valve and the outlet.

Some embodiments provide a fluid flow path in which fluid flows from the inlet through the housing to the outlet, the fluid flow path including a barrier portion wherein fluid is retained to substantially prevent gas and debris from fouling the check valve, the barrier portion providing a sufficiently small gap so that fluid is maintained in the barrier portion regardless of the orientation of the valve.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A valve for supplying fluid from a fluid source to a system, comprising:
    a housing having an axial conduit extending along a central axis from an inlet at one end for entry of fluid into the housing to an outlet at an opposite end for exit of fluid from the housing;
    a check valve body disposed within the axial conduit of the valve housing; and
    a fluid flow path through which fluid flows from the inlet through the check valve body to the outlet, wherein fluid is retained within a portion of the fluid flow path to substantially surround the check valve body preventing gas and debris from the outlet from entering the check valve body and wherein the fluid flow path includes a first spring biasing a first ball, a second ball, and a second spring between the first ball and the second ball and biasing the first ball and the second ball in opposite directions.

2. The valve of claim 1, wherein the inlet and the outlet are aligned along the central axis.

3. The valve of claim 1, wherein the check valve body is coaxial with the housing.

4. The valve of claim 1, wherein the housing is threaded at the outlet for connection to a system to which fluid is supplied, wherein the threaded connections are coaxial along the central axis of the housing.

5. A valve for supplying fluid from a fluid source to a system, comprising:
- a housing having an axial conduit extending along a central axis from an inlet at one end for entry of fluid into the housing to an outlet at an opposite end for exit of fluid from the housing;
- a check valve body disposed within the axial conduit of the valve housing and coaxial with the housing; and
- a fluid flow path through which fluid flows from the inlet through the check valve body to the outlet, wherein fluid is retained within a portion of the fluid flow path to substantially surround the check valve body preventing gas and debris from the outlet from entering the check valve body and wherein the check valve body includes a first valve body section having a first end adjacent to the inlet of the housing and a distal end, and a second valve body section having a first end threaded into the distal end of the first valve body section forming a fluid seal and a second distal end adjacent to the outlet of the housing.

6. The valve of claim 5, wherein the fluid flow path extends from the inlet of the housing into the first valve body section at an inlet port through a central conduit and out through at least one radial port to the axial conduit that forms an annular fluid jacket between the first and second valve body sections and the housing, so that the annular fluid jacket retains fluid preventing gas and debris from entering the central conduit of the first valve body section.

7. The valve of claim 6, wherein the second valve body section includes at least one groove at the second distal end extending along an outer surface of the second valve body section to the outlet of the housing.

8. The valve of claim 6, wherein the second valve body section includes at least one port at the second distal end in communication with the annular section and a central axial outlet port in communication with the outlet.

9. The valve of claim 6, wherein the first valve body section has at least one check valve located within the central conduit between inlet port and the at least one radial port.

10. The valve of claim 9, wherein the at least one check valve is a ball biased by a spring.

11. The valve of claim 10, wherein the first end of the second valve body section is received within the central conduit of the first valve body section and supports the spring.

12. The valve of claim 11, wherein rotation of the second valve body section within the first valve body section compresses the spring loading the ball against the inlet port.

13. A method of manufacturing a valve structure, comprising:
- forming a housing having an axial conduit extending from a fluid inlet at a first end to a fluid outlet at a second end;
- forming a check valve body having a first valve body section and a second valve body section, the first valve body section having an inlet port to conduct fluid through the check valve body to an outlet port in the second valve body section or between the second valve body section and the housing;
- inserting into the first valve section a second ball, a second spring, a first ball, and then a first spring into the first valve body section, the second spring biasing the first and second ball; and
- positioning the check valve body within the axial conduit of the housing forming a fluid flow path that extends from the inlet through the check valve body to the outlet, wherein a portion of the fluid flow path is formed to retain fluid to surround the check valve body to prevent gas and debris from entering the check valve body.

14. The method of claim 13, wherein threaded connections at the fluid inlet and the fluid outlet are coaxial along a central axis of the housing.

15. The method of claim 13, wherein the first valve body section is formed to be rotatably connected to the second valve body section.

16. The method of claim 13, wherein the check valve body is formed with at least one spring biased ball valve.

17. A valve for supplying fluid from a fluid source to a system, comprising:
- a housing having an inlet at one end for entry of fluid into the housing and an outlet at an opposite end for exit of fluid from the housing;
- two check valves disposed within the housing; and
- a fluid flow path in which fluid flows from the inlet through the housing to the outlet, the fluid flow path including a barrier portion between the two check valves and the outlet wherein fluid is retained to substantially prevent gas and debris from fouling the check valve, the barrier portion providing a sufficiently small gap so that fluid is maintained in the barrier portion due to surface tension regardless of the orientation of the valve.

18. The valve of claim 17 in which the barrier portion comprises an annular gap.

19. The valve of claim 17 further comprising a lubricant for a natural gas compressor in at least part of the fluid flow path and in which the lubricant is maintained in the barrier portion by surface tension.

20. A lubrication system, comprising:
- a source of a pressurized lubricant; and
- a valve in accordance with claim 17.

21. A natural gas compressor comprising:
- a compressor;
- a lubrication system in accordance with claim 20 in which the check valve outlet provides lubricant to the compressor.

* * * * *